United States Patent
Schulze

[11] Patent Number: 5,957,793
[45] Date of Patent: Sep. 28, 1999

[54] MECHANICAL CHAIN TENSIONER BASIC BODY

[75] Inventor: Peter Schulze, Gardolostr, Germany

[73] Assignee: Joh. Winkhofer & Soehne GmbH & Co., Munich, Germany

[21] Appl. No.: 08/807,052

[22] Filed: Feb. 26, 1997

[30] Foreign Application Priority Data

Feb. 29, 1996 [DE] Germany ............................ 296 03 718

[51] Int. Cl.[6] ..................................................... F16H 7/08
[52] U.S. Cl. ........................... 474/101; 474/111; 474/140
[58] Field of Search .................... 474/101, 109, 474/113, 111, 110, 119, 112, 125, 140

[56] References Cited

U.S. PATENT DOCUMENTS

| | | | |
|---|---|---|---|
| 3,490,302 | 1/1970 | Turner et al. ............................ | 474/111 |
| 4,713,043 | 12/1987 | Biedermann ............................ | 474/111 |
| 4,826,468 | 5/1989 | Friedrichs ................................ | 474/101 |
| 5,286,234 | 2/1994 | Young ..................................... | 474/111 |
| 5,318,482 | 6/1994 | Sota et al. ............................... | 474/111 |
| 5,462,493 | 10/1995 | Simpson ................................. | 474/111 |
| 5,690,569 | 11/1997 | Ledvina et al. ........................ | 474/111 |
| 5,720,682 | 2/1998 | Tada ..................................... | 474/101 X |

*Primary Examiner*—John A. Jeffery
*Assistant Examiner*—Marcus Charles
*Attorney, Agent, or Firm*—Seed and Berry LLP

[57] ABSTRACT

In a mechanical chain tensioner (K) which comprises a molded part having fastening openings and abutments, as a basic body (G) on which a tension bracket (B) can be mounted on the abutments, the basic body (G) is an integral molded part of filled or reinforced, injection-moldable plastic.

6 Claims, 1 Drawing Sheet

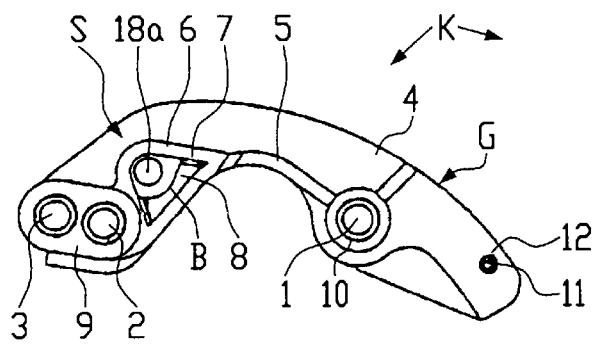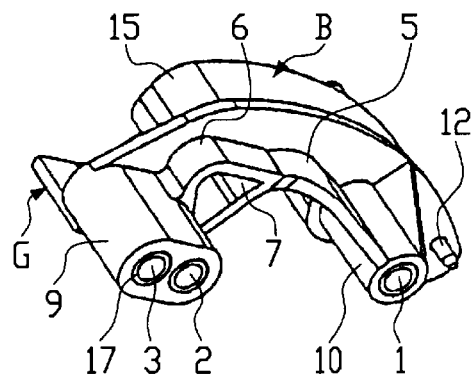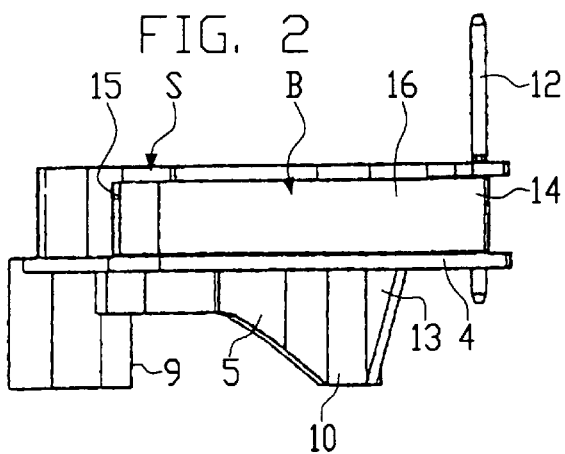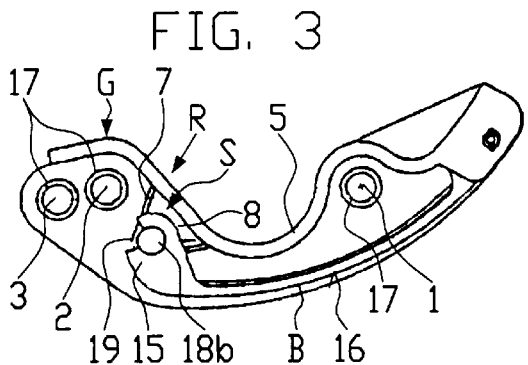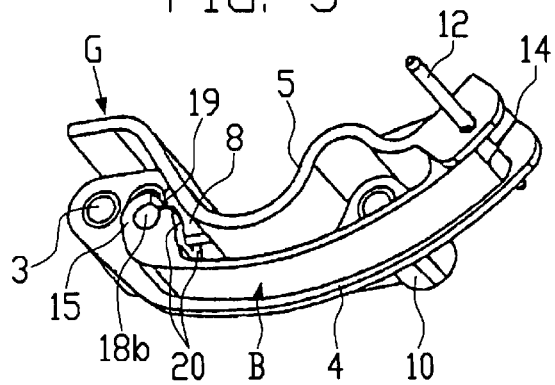

MECHANICAL CHAIN TENSIONER BASIC BODY

BACKGROUND OF THE INVENTION

The present invention relates to a mechanical chain tensioner of the type used, for example, in an internal combustion engine.

In a mechanical chain tensioner of such a type, which is known in practice, the basic body is a punched/bent part from a sheet metal having a constant wall thickness. The basic body has an arcuate vertical web, on the concave bottom side of which a transverse wall is bent for reasons of stiffness. Two punched holes form fastening openings in which bushings are riveted, or into which bushings are pressed and welded. An abutment for the tension bracket is a bearing pin which has been riveted into the web, and onto which the tension bracket is slid in the longitudinal direction of the pin and is secured by an additional securing element against withdrawal. The basic body is expensive in production and heavy. It must, so to speak, be tailored to every mode of fastening, since the distances of the fastening openings are different for different types of internal combustion engines. Moreover, the basic body requires a surface treatment.

In a chain tensioner which is known from EP-A-0 581 219, a solid, metallic support is provided for the tension bracket.

In a chain tensioner which is known from EP-A-0 195 945, a guide housing is provided for the piston in the chain tensioner carrier, which is made of metal. The tensioning rail of the chain tensioner is made of plastics for reasons of cost and weight.

SUMMARY OF THE INVENTION

It is the object of the present invention to provide a mechanical chain tensioner of the above-mentioned type which can be manufactured at low cost, is universally usable and lightweight.

The filled or reinforced plastic material, e.g. reinforced with fibers, can be processed at low cost and leads to a considerably reduced weight despite an identical strength and stiffness. In an injection-molding process the shape can be given a much more variable design than in the punching and bending of sheet metal. Design measures which are of importance to the function can be taken integrally. A surface treatment is not necessary.

In an alternate embodiment working steps, e.g. for attaching fastening bushings, can be dispensed with thanks to the integration of the transverse projections with the fastening holes in the basic body. The entire structure of the basic body is virtually used for force transmission.

The basic body in another alternate embodiment can selectively be employed for at least two different cases of use in which the distances between the fastening points differ. The respectively suited fastening hole is then chosen for fastening. As a result, the basic body can be used in a universal manner. The respectively unsuited fastening hole remains unused.

In another alternate embodiment, stiffening bushings of metal, which might be required, are already introduced during the injection molding of the basic body. Additional operative steps for fixing the stiffening bushings are not necessary.

In another alternate embodiment, the stiffening bushings required are just pressed in.

In yet another embodiment, the pivot bearing for the tension bracket forms part of the basic body from the very beginning, which saves additional mounting steps and also additional fittings. The pivot bearing can easily be formed when the basic body is injection-molded. Moreover, with an integrally molded pivot bearing, advantageous force transmission conditions can be guaranteed from the very beginning.

The tension bracket can be installed and disassembled in an especially comfortable manner in yet another embodiment. Additional securing elements for the tension bracket are no longer needed because the locking connection fulfills this function now.

In yet another embodiment, the arrangement of the bearing block on the transverse wall ensures favorable force transmission conditions, because the tension bracket subjects the pivot bearing to a pressure load, and not to a bending load as in the known basic body.

In yet another embodiment, the symmetrical arrangement of the bearing pin on the bearing block excludes one-sided or eccentric load conditions that are favorable with respect to production and installation. The tension bracket can be mounted and dismounted in one operation. Additional securing elements are not needed. In an alternative embodiment, two spaced-apart bearing blocks are molded with a single bearing pin located thereinbetween, and the bearing eye of the tension bracket is clipped onto the bearing pin by means of an insertion slot. The two bearing blocks receive the bearing eye thereinbetween and center the tension bracket on the basic body. Furthermore, it is possible to form the bearing pin(s) not already during the production of the basic body, but either to insert the bearing pin of metal into the injection mold and to injection-mold therearound, or to press in the bearing pin at a later time or during installation of the tension bracket. A reverse construction may have advantages, i.e. to arrange the bearing pin(s) on the tension bracket and to form the pivot bearing fixed on the basic body, just as a locking opening with bearing point.

In yet another embodiment, the bearing block which engages into the bearing eye ensures that the tension bracket is centered against displacement on the bearing pins.

An embodiment of the subject matter of the invention will now be explained with reference to the drawing, in which:

BRIEF DESCRIPTION OF THE DRAWINGS

FIG. 1 is a front view of a mechanical chain tensioner;

FIG. 2 a top view of the chain tensioner;

FIG. 3 a rear view of the chain tensioner;

FIG. 4 a perspective view with respect to FIG. 1; and

FIG. 5 a perspective view with respect to FIG. 3.

DESCRIPTION OF THE PREFERRED EMBODIMENTS

A mechanical chain tensioner, especially for an internal combustion engine, comprises a basic body G made from a filled or reinforced plastic material, which has been processed by injection molding. A tension bracket B which is intended to cooperate with a chain (not shown) can be mounted or is mounted on the basic body G. The basic body G is an integral molded part of plastics comprising fastening holes 1, 2, 3 formed in transverse projections 10, 9 (for fixing the basic body G). The transverse projections 9, 10 extend away from a center web 4 and are made integral with the web. Transverse walls 5 which interconnect the transverse projections 9, 10 in stiffening fashion at the side where the transverse projections 9, 10 protrude, extend along the arcuately curved bottom side of the center web 4 at both sides. Additional stiffening ribs 13 may be provided. A through hole 11 for a securing element 12 is formed in an end portion of the center web 4. An arcuately curved transverse wall 6 extends from the transverse projection 9 up to the transverse wall 5, with the two transverse walls 5, 6 defining thereinbetween an approximately triangular window 7 which passes through the center web 4. A bearing block 8 which is e.g. approximately triangular, and whose wall thickness corresponds approximately to the wall thickness of the center web 4 and/or the transverse walls 5, 6, is formed on the transverse wall 5 at the side of the center web 4 which is oriented away from the transverse projections 9, 10. In this embodiment the bearing block 8 has provided thereon two integrally formed coaxial bearing pins 18a, 18b which extend in a direction approximately perpendicular to the center web 4 and project each from a side of the bearing block 8. The bearing block 8 together with the bearing pins 18a, 18b forms a pivot bearing S for the tension bracket B to be mounted on the basic body G, the tension bracket being also suitably a molded part of plastics, however, of non-filled, readily slidable and wear-resistant plastics with resilient characteristics. The tension bracket B is connected to the basic body G via a detachable locking connection R (FIGS. 3 and 5) and is centered by the bearing block 8 in the axial direction of the bearing pins 18a, 18b.

The tension bracket B has an end 14 which can be fixed, inter alia, onto the center web 4 by means of the securing element 12 for the assembly or disassembly of the chain tensioner. The other end of the tension bracket B is formed as a bearing eye 15 and pivotably fastened to the pivot bearing S. The back of the bent tension bracket B defines a slide surface 16.

The bearing pins 18a, 18b can be integrally injection-molded with the bearing block 8. It is also possible to insert a metallic bearing pin during the injection-molding process or at a later time. The bearing eye 15 has a bifurcated shape (FIG. 5), so that the bearing block 8 engages between side walls 20 of the bearing eye 15 and effects a centering. For an easy mounting of the tension bracket B by way of clips, the bearing eye 15 has recessed therein insertion slots 19 through which the bearing pins 18a, 18b snap into bearing holes when the bearing eye 15 is pressed on.

Stiffening bushings 17 of metal are pressed into the fastening holes 1, 2, 3 or are injection-molded around when the basic body is produced in the injection mold. At least the transverse projection 9 contains at least two fastening holes 2, 3 which are preferably in close vicinity to each other, so that one and the same basic body G can be selectively fixed by using fastening hole 1 and fastening hole 2 or fastening hole 3. It would also be possible to equip the transverse projection 10 with two fastening holes. More than two fastening holes could also be provided in each of the transverse projections 9, 10.

Thanks to the transverse walls 5, which extend at both sides of the center web 4, and the integrally formed transverse projections 9, 10, optionally with stiffening ribs 13, the basic body G shows a very great design strength at a low weight. The pivot bearing S which is formed on the transverse wall 5 guarantees a favorable force transmission, since the tension bracket B which exerts pressure forces in parallel with the plane of the center web 4 is supported on the transverse wall 5.

It would also be possible to form two spaced-apart bearing blocks 8 on the transverse wall 5 and to connect the blocks through an intermediate bearing pin, so that the bearing eye 15 (in a continuous configuration without bifurcated shape) can be clipped onto the bearing pin by means of an insertion slot 19 and is centered between the bearing blocks.

I claim:

1. A mechanical chain tensioner comprising a molded part including fastening openings and abutments, as a basic body on which a tension bracket is mounted on the abutments, the basic body being an integral molded part of fiber-reinforced, injection-moldable plastic, the basic body having an integrally molded pivot bearing defining a tension bracket abutment of said basic body, the pivot bearing being arranged on a transverse wall which connects transverse projections, and the pivot bearing has a bearing block which rises upwards from the transverse wall and has coaxial bearing pins at both sides, in that a bearing eye, is recessed in a manner of a fork, and attached with the tension bracket, said tension bracket comprising bearing holes for the bearing pins, and insertion slots which are open outwards towards the bearing holes formed in the bearing eye for the bearing pins, the bearing eye being clipped to, and centered in the axial direction of the bearing pins on the bearing block, which engages into the bearing eye.

2. A mechanical chain tensioner according to claim 1, wherein the transverse projections each have at least one fastening hole.

3. A mechanical chain tensioner according to claim 1, wherein the pivot bearing is integrally molded in said basic body and is designed to detachably and pivotably secure a tension bracket on said pivot bearing via a snap-in locking connection.

4. A mechanical chain tensioner according to claim 2, wherein the transverse projection contains at least two adjacent, parallel fastening holes defining said fastening openings.

5. A mechanical chain tensioner according to claim 2 wherein the fastening holes define said fastening openings and contain stiffening bushings of metal which are injection-molded therearound.

6. A mechanical chain tensioner according to claim 2, wherein the fastening holes define said fastening openings and contain stiffening bushings of metal which have been pressed thereinto.

* * * * *

UNITED STATES PATENT AND TRADEMARK OFFICE
CERTIFICATE OF CORRECTION

PATENT NO.     : 5,957,793
DATED          : September 28, 1999
INVENTOR(S)    : Peter Schulze It is certified that an error appears in the above identified patent and that said Letters Patent is hereby corrected as shown below:

On the cover page, item [73], delete "Winkhofer" and substitute therefor -- Winklhofer --.

Signed and Sealed this

Sixth Day of June, 2000

Attest:

Attesting Officer

Q. TODD DICKINSON
Director of Patents and Trademarks